US007895919B2

(12) United States Patent
Vicars

(10) Patent No.: US 7,895,919 B2
(45) Date of Patent: Mar. 1, 2011

(54) CONNECTING ROD

(76) Inventor: Berton L. Vicars, Ruidoso, NM (US)

( * ) Notice: Subject to any disclaimer, the term of this patent is extended or adjusted under 35 U.S.C. 154(b) by 56 days.

(21) Appl. No.: 12/457,506

(22) Filed: Jun. 12, 2009

(65) Prior Publication Data

US 2010/0313703 A1  Dec. 16, 2010

(51) Int. Cl.
*F16C 7/00* (2006.01)
(52) U.S. Cl. .................................................. 74/579 R
(58) Field of Classification Search ............... 74/579 R, 74/587, 593, 579 E
See application file for complete search history.

(56) References Cited

U.S. PATENT DOCUMENTS

| 2,033,601 | A | * | 3/1936 | Wohanka | 74/579 E |
| 2,146,493 | A | * | 2/1939 | Wintzer | 384/430 |
| 3,448,664 | A | * | 6/1969 | Hulsing | 92/157 |
| 3,789,743 | A | * | 2/1974 | Sihon | 92/187 |
| 4,644,853 | A | * | 2/1987 | Russell et al. | 92/190 |
| 6,786,111 | B2 | | 9/2004 | Vicars | |

* cited by examiner

*Primary Examiner*—Vicky A Johnson
(74) *Attorney, Agent, or Firm*—Stephen R. Greiner

(57) ABSTRACT

A connecting rod including a shaft, a link attached to the shaft, and a number of threaded fasteners for attaching the link to the shaft. The shaft has a major flange affixed to one of its opposed ends that can be attached to a bearing housing. A minor flange is affixed to the other of the opposed ends of the shaft and has a cylindrical concavity in its top. The minor flange has a shoulder portion and a pair of arm portions that radiate outwardly and upwardly from the shoulder portion. A link has a ring that is snugly, yet releasably, positioned within the cylindrical concavity.

6 Claims, 2 Drawing Sheets

US 7,895,919 B2

CONNECTING ROD

FIELD OF THE INVENTION

This invention relates to machine elements and, more particularly, to pitmans and connecting rods.

BACKGROUND OF THE INVENTION

Hydraulic fracturing can increase the rate of production of oil and gas from low-permeability reservoirs. Hydraulic fracturing increases the permeability of reservoir rocks by opening channels through which oil and gas can move. During a hydraulic fracturing procedure, a fluid is pumped through a wellbore under high pressure into a subterranean reservoir where it splits or fractures the reservoir rock. A proppant, like sand, is often added to the pumped fluid and is carried in suspension into the newly formed fractures. When pumping ceases, the fractures partially close on the proppant, leaving channels for oil and gas to flow to a recovery well.

High-pressure pumps are used to complete hydraulic fracturing procedures or "frac jobs." These pumps often have connecting rods that join a crosshead to a plunger that pressurizes the fracture fluid. A conventional connecting rod is cast as a single unit and is subsequently machined to its finished dimensions. When portions of such a connecting rod wear out, the rod must be replaced in its entirety—a time-consuming and costly project. Multi-piece connecting rods have been developed as a substitute for one-piece rods so as to minimize rod replacement time by permitting just the worn portions of a rod to be swapped. Multi-piece rods have not, however, gained widespread acceptance since wear tends to occur not only in the usual spots, but, also, at the junctions between the joined pieces. Thus, multi-piece connecting rods often require full replacement when partially worn.

SUMMARY OF THE INVENTION

In view of the problems associated with the connecting rods that are commercially available, it is my principal object to provide a new, connecting rod with two portions that can be easily disconnected from one another for replacement when worn. Once disconnected, a worn portion can be removed and replaced while the other portion remains in place in a pump, thus saving time and money. Disconnection can be accomplished with ordinary tools and with minimal training.

It is another object of mine to provide a connecting rod of the type described that has a solid, simplified, self-aligning connection between its two principal portions. Such a connection limits wear at the point of contact between the two portions and ensures that set-up by even an inattentive mechanic will be proper prior to use.

It is another object of the invention to provide a connecting rod of the type described whose principal portions are each formed as a single, unified piece. Lacking welds and other mechanical connectors, each rod portion has maximum strength.

It is an object of the invention to provide improved, functional features and arrangements of features in a connecting rod for the purposes described that is lightweight in construction, inexpensive to manufacture, and dependable in use. Although the connecting rod is described as being of particular utility in oilfield pumps, it is believed that it will provide similar benefits in other reciprocating engines and machines.

Briefly, my connecting rod achieves the intended objects by featuring a shaft with opposed ends. A major flange is affixed to one of the opposed ends and is adapted for attachment to a bearing housing. A minor flange is affixed to the other of the opposed ends of the shaft. The minor flange has a shoulder portion and a pair of arm portions. Each of the arm portions is affixed to a respective one of the opposite sides of the shoulder portion and radiates outwardly and upwardly from the shoulder portion. Together, the shoulder portion and arm portions define a cylindrical concavity in the top of the minor flange. Each of the arm portions is provided with a pair of spaced-apart holes that extend into the cylindrical concavity. A link has a ring that is snugly, yet releasably, positioned within the cylindrical concavity. The ring is provided with a transverse aperture. The ring is also being provided with a plurality of helically threaded bores positioned for registration with the holes in the arm portions. The helically threaded bores radiate outwardly from the center of the transverse aperture. A number of threaded fasteners are provided, each respectively passes through one of the holes and threadably engages one of the bores to releasably fastening the shaft and the link together.

The foregoing and other objects, features and advantages of my connecting rod will become readily apparent upon further review of the following detailed description of the connecting rod that is illustrated in the accompanying drawings.

BRIEF DESCRIPTION OF THE DRAWINGS

My connecting rod can be more readily described with reference to the accompanying drawings, in which.

Similar reference characters denote corresponding features consistently throughout the drawings.

DETAILED DESCRIPTION OF THE CONNECTING ROD

Figure 1:
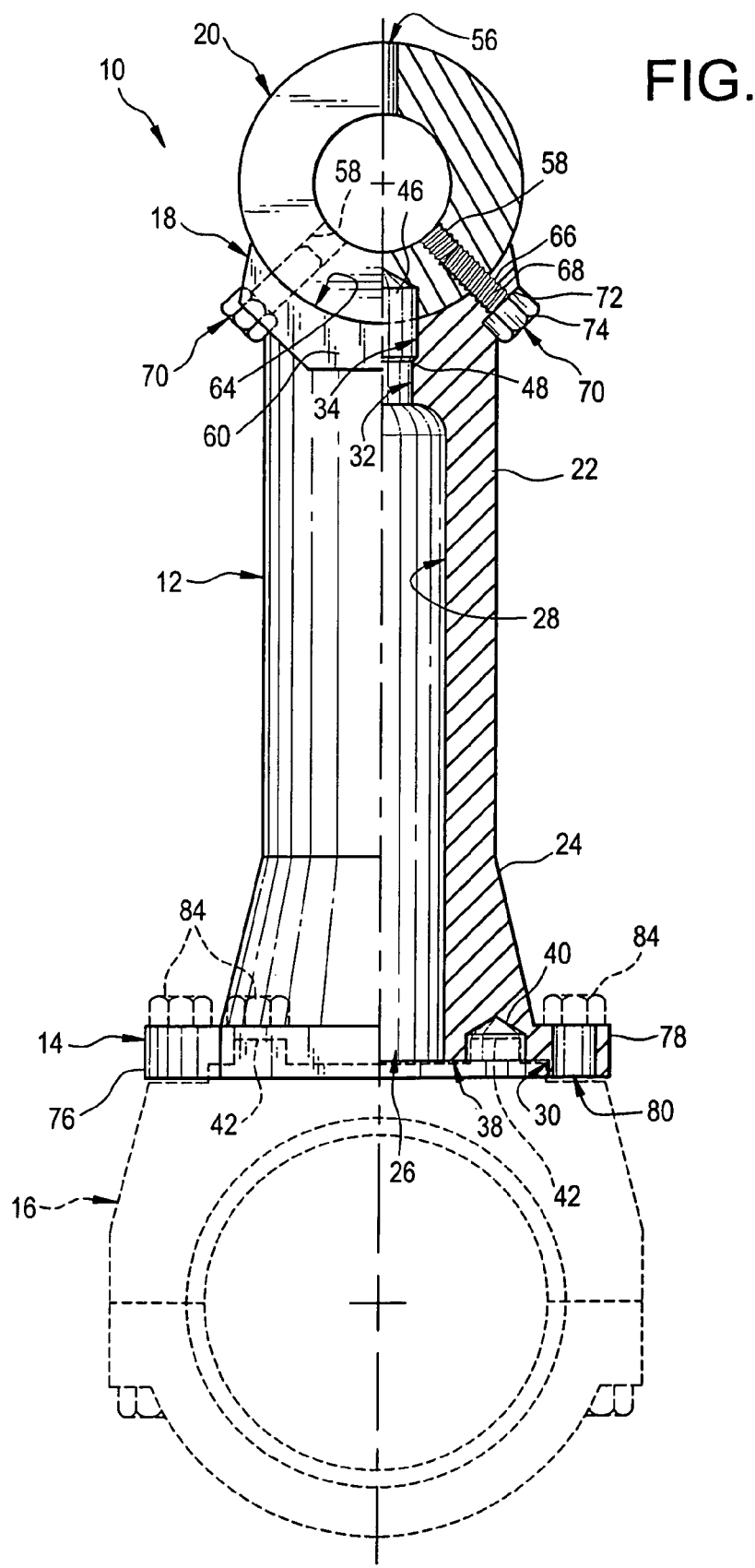
FIG. 1 is a front elevational view of my connecting rod with portions broken away to reveal interior details thereof.
Figures 2, 3, 4:
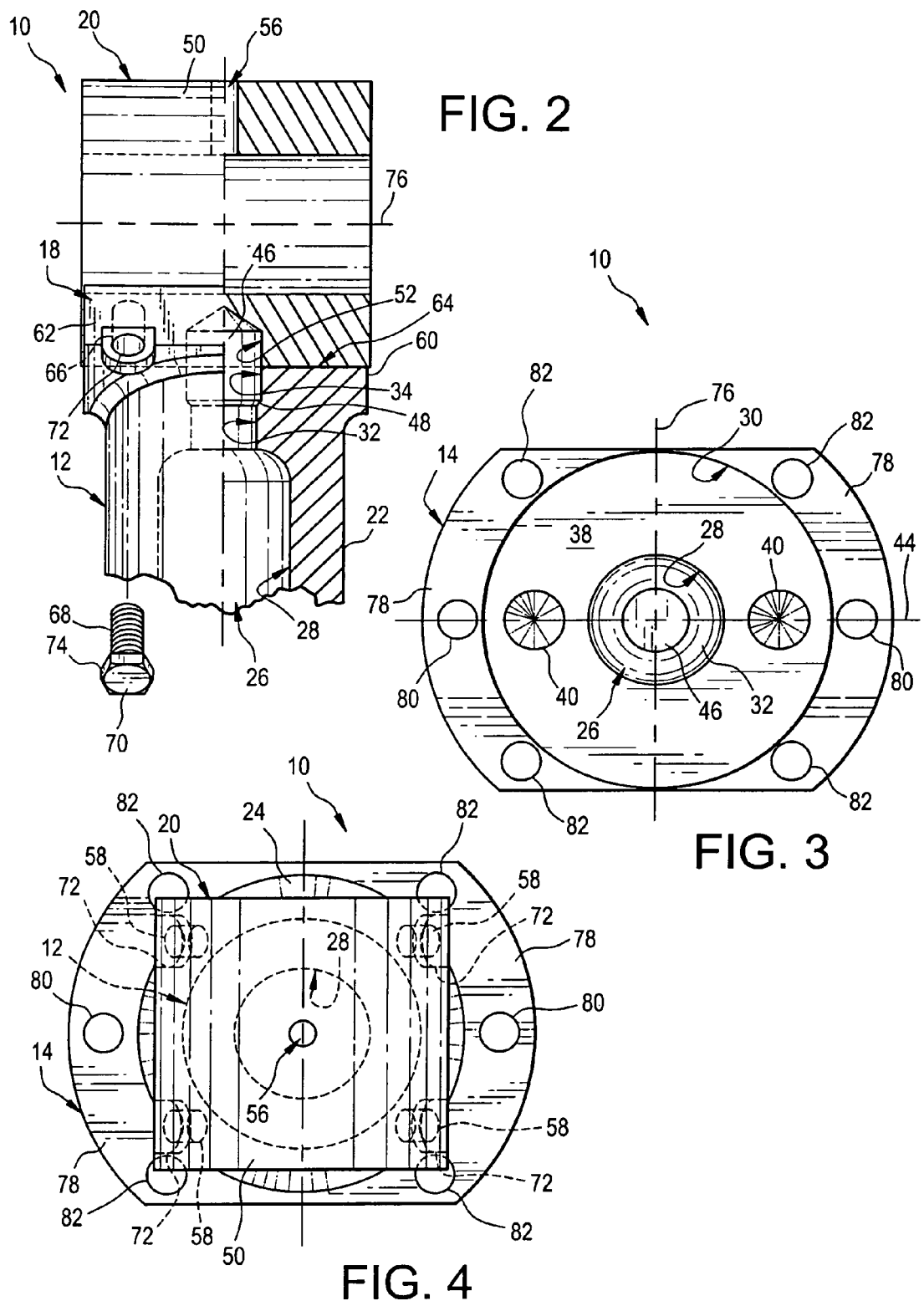
FIG. 2 is a side elevational view of the top portion of my connecting rod with portions broken away to reveal interior details thereof.
FIG. 3 is a bottom view of my connecting rod.
FIG. 4 is a top view of my connecting rod.

Referring now to the FIGS., a connecting rod in accordance with the present invention is shown at 10. Connecting rod 10 includes a shaft 12 having a major flange 14 affixed to its bottom end that is adapted for releasable attachment to a bearing housing 16. A minor flange 18 is affixed to the top end of shaft 12 to which a crosshead link 20 is releasably attached.

Shaft 12 is a hollow tube with an upper, cylindrical section 22 and a lower, gusset section 24 affixed to the bottom of cylindrical section 22. Cylindrical section 22 has a constant, outer diameter along its length. Gusset section 24, however, has an outer diameter that gradually increases in diameter as the distance away from cylindrical section 22 increases. Gusset section 24 serves to reinforce major flange 14 that is larger in size than minor flange 18.

Shaft 12 is provided with a weight-reducing passageway 26 that extends longitudinally through both gusset section 24 and cylindrical section 22. Passageway 26 has an elongated section bounded by a first inner wall 28 that extends through gusset section 24 and cylindrical section 22. Beneath the elongated section, passageway 26 is enlarged, being bounded by a second inner wall 30 having an inner diameter that is greater than that of first inner wall 28. Above the elongated section, however, passageway 26 is restricted, being bounded by a third inner wall 32 having an inner diameter that is less than that of first inner wall 28. Immediately above third inner wall 32 is a fourth inner wall 34 having an inner diameter that is greater than that of third inner wall 32.

The section of passageway 26 bounded by second inner wall 32 forms a socket for snugly receiving an alignment plug 36 projecting upwardly from bearing housing 16. A planar shoulder 38 is formed in the bottom end of first inner wall 28 at the junction of first inner wall 28 and second inner wall 30. A pair of alignment bores 40, for receiving a pair of alignment pins 42 extending upwardly from alignment plug 36, is provided in shoulder 38. The centers of bores 40 define a lateral axis 44 through shaft 12.

The section of passageway 26 bounded by fourth inner wall 34 forms a socket for snugly, yet releasably, receiving an alignment pin 46 being part of link 20. A shoulder 48 is formed in the top end of third inner wall 32 at the junction of third inner wall 32 and fourth inner wall 34. Shoulder 48 slopes downwardly and inwardly.

Alignment pin 46 of crosshead link 20 is stopped by shoulder 48 from falling downwardly into shaft 12. Pin 46 is dimensioned such that it projects upwardly from shaft 12 when it is positioned in its socket and against shoulder 48. Pin 46 has a solid cylindrical form with a diameter that is slightly smaller than that of fourth inner wall 34. For proper centering and seating on the top of shoulder 48, the bottom end of pin 46 is tapered. (The top end of pin 46 is similarly tapered.) Pin 46 assures the proper centering of link 20 on shaft 12 and that link 20 does not creep or rotate relative to shaft 12.

Crosshead link 20 has a ring 50 with a longitudinal aperture 52 for snugly, yet releasably, receiving the top of pin 46 extending upwardly from shaft 12 and a transverse aperture 54 for receiving a crosshead pin (not shown). To supply a flow of lubricating oil to the interior of aperture 54, a lubrication opening 56 passes through the top of ring 50 in axial alignment with longitudinal aperture 52 and intersects the top of transverse aperture 54. A pair of helically threaded bores 58 is provided on each of the opposite sides of aperture 54 such that bores 58 define a pattern with a square outline in the bottom of ring 50. As shown, bores 58 incline about 30° from vertical and have central axes that radiate outwardly and downwardly from the central axis of aperture 54.

Minor flange 18 strengthens the connection between shaft 12 and link 20 and is integrally formed with shaft 12. When viewed from above, minor flange 18 is seen to have a square outline. When viewed from the side, however, flange 18 is seen to look like a "U" with a central, shoulder portion 60, surrounding and reinforcing walls 32 and 34, and a pair of arm portions 62 that are affixed to the opposite sides of shoulder portion 60 and that radiate outwardly and upwardly therefrom. Together, portions 60 and 62 define a cylindrical concavity 64 in the top of flange 18 for snugly, yet releasably, receiving ring 50.

Each of arm portions 62 is provided with a pair of holes 66 for registration with a pair of bores 58 on one side of transverse aperture 54 in ring 50. The threaded shafts 68 of bolts 70 are extended through holes 66 and screwed into bores 58 to releasably attach shaft 12 to link 20. Recesses 72 are provided at the bottoms of holes 66 for partially receiving the enlarged, polygonal heads 74 of bolts 70 that are incapable of positioning in holes 66. When bolts 70 are firmly tightened, the longitudinal axis 76 of transverse aperture 54 is oriented at right angles to lateral axis 44 passing through the centers of alignment pin receiving holes 40.

Major flange 14 strengthens the connection between shaft 12 and bearing housing 16. Major flange 14 has a pair of projections 78 that extend outwardly from opposite sides of gusset section 24 perpendicular to the longitudinal axis 76 of transverse aperture 54. Each of projections 78 has three, spaced-apart holes 80 and 82 through which bolts 84 are extended to attach connecting rod 10 to bearing housing 16. The center holes 80 are centered on lateral axis 44 and the remaining holes 82 are positioned equidistantly from lateral axis 44.

The installation of connecting rod 10 in a pump is straightforward. First, shaft 12 and link 20 together with bolts 70. Then, a crosshead pin (not shown) is extended through transverse aperture 54 in ring 50. Next, bolts 84 are extended through major flange 14 and into bearing housing 16 previously connected to the power end of the pump, and tightened. The perfect alignment of connecting rod parts is assured by the arrangement of alignment plug 36 and pins 42 and 46 and bolts 70 and 84. After securing all hatches and ancillary parts of the pump, the pump is ready to drive connecting rod 10.

After the pump has been run for substantial period, ring 50 may show signs of wear around aperture 54 that serves as a bearing surface. (Shaft 12 is unlikely to show any wear since there is no movement of bearing housing 16 and relative to link 20 during the use of connecting rod 10.) By untightening bolts 70 and manipulating the crosshead, a worn ring 50 can be removed from shaft 12 and replaced by an unworn link 20. Reinstalling bolts 70 in the new ring 50 permits the pump to be reenergized. Since service work does not require the removal of bearing housing 16 from the pump, it can be completed in minimal time. Furthermore, since only the worn ring 50 is replaced, there is no wastage of costly, machined parts.

While connecting rod 10 has been described with a high degree of particularity, it will be appreciated by those skilled in the field that modifications can be made to it. Therefore, it must be understood that my invention is not limited solely to connecting rod 10, but encompasses any and all connecting rods within the scope of the following claims.

I claim:

1. A connecting rod, comprising:
    a shaft including:
        opposed ends;
        a major flange being affixed to one of said opposed ends, and said major flange being adapted for attachment to a bearing housing;
        a minor flange being affixed to the other of said opposed ends, said minor flange including:
            a shoulder portion having opposite sides; and,
            a pair of arm portions, each being affixed to a respective one of said opposite sides of said shoulder portion and radiating outwardly and upwardly from said shoulder portion wherein said shoulder portion and said arm portions, together, define a cylindrical concavity in the top of said minor flange, and each of said arm portions being provided with a pair of spaced-apart holes that extend into said cylindrical concavity;
    a link having:
        a ring positioned within said cylindrical concavity, said ring being provided with a transverse aperture, said ring also being provided with a plurality of helically threaded bores positioned for registration with said holes in said arm portions, said helically threaded bores radiating outwardly from the center of said transverse aperture; and,
    a plurality of threaded fasteners, each respectively passing through one of said holes and threadably engaging one of said bores for releasably fastening said shaft and said link together.

2. The connecting rod according to claim 1 wherein said shaft is provided with a first socket in the top thereof that opens into said cylindrical concavity and said ring is provided with a longitudinal aperture in the bottom thereof for registration with said first socket and said link further includes an alignment pin being snugly, yet releasably, positioned in said first socket and said longitudinal aperture.

3. The connecting rod according to claim 1 wherein said ring is provided with a lubrication opening in the top thereof for the passage of oil to said transverse aperture.

4. The connecting rod according to claim 1 wherein said shaft is hollow.

5. The connecting rod according to claim 1 wherein said shaft is provided with a second socket in the bottom thereof for receiving an alignment plug projecting upwardly from the top of a bearing housing.

6. The connecting rod according to claim 5 wherein said shaft is further provided with a pair of bores positioned within said second socket for receiving a pair of alignment pins extending upwardly from an alignment plug of a bearing housing.

* * * * *